United States Patent [19]

Ganmukhi et al.

[11] Patent Number: 5,541,918
[45] Date of Patent: Jul. 30, 1996

[54] METHOD AND APPARATUS FOR MANIPULATING AN ATM CELL

[75] Inventors: Mahesh N. Ganmukhi, Wexford; Brian L. Jordan, Pittsburgh, both of Pa.

[73] Assignee: Fore Systems, Inc., Warrendale, Pa.

[21] Appl. No.: 381,110

[22] Filed: Jan. 31, 1995

[51] Int. Cl.$^6$ ................................................. H04L 12/56
[52] U.S. Cl. ........................................ 370/60.1; 370/94.2
[58] Field of Search ...................... 365/189.01, 189.04; 370/60, 60.1, 61, 94.1, 94.2

[56] References Cited

U.S. PATENT DOCUMENTS

| | | | |
|---|---|---|---|
| 5,309,395 | 5/1994 | Dickinson et al. | 365/189.04 |
| 5,394,361 | 2/1995 | Dickinson | 365/189.04 |

*Primary Examiner*—Wellington Chin
*Attorney, Agent, or Firm*—Ansel M. Schwartz

[57] ABSTRACT

The present invention pertains to an apparatus for manipulating ATM cells. The apparatus comprises a memory array in which an entire ATM cell can be read or written in one read or write cycle. The apparatus is also comprised of a mechanism for reading or writing the entire ATM cell from or into the memory array. The present invention pertains to a method for switching an ATM cell. The method comprises the steps of receiving the ATM cell at a first input port of a switch from the ATM network. Then there can be the step of storing the ATM cell in one clock cycle in a memory array of the switch. Next there is the step of reading the ATM cell in the memory array in one clock cycle. Next there is the step of transferring the ATM cell from the memory array to a first output port of the switch. Next there is the step of transmitting the ATM cell from the first output port to the ATM network. The present invention pertains to a switch for an ATM cell. The switch comprises I input ports which receive ATM cells from an ATM network, where I>1 and is an integer. The switch is also comprised of a memory array connected to the I input ports for storing an ATM cell received by one of the I input ports in one clock cycle. The switch also comprises O output ports connected to the memory array, where O>1 and is an integer. One of the O output ports transmit an ATM cell which is received from the memory array to the ATM network. Additionally, the switch comprises a controller connected to the memory array, I input ports and O output ports for controlling the storage of an ATM cell from one of the input ports into the memory array in one clock cycle. The switch can be used for normal switching operation, multicasting, demultiplexing or multiplexing.

38 Claims, 8 Drawing Sheets

5,541,918

METHOD AND APPARATUS FOR MANIPULATING AN ATM CELL

CROSS-REFERENCE

This application is related to contemporaneously filed U.S. patent application Ser. No. 08/381,112 titled "METHOD AND APPARATUS FOR SWITCHING, MULTICASTING, MULTIPLEXING AND DEMULTIPLEXING AN ATM CELL" by Mahesh N. Ganmukhi and Brian L. Jordan.

FIELD OF THE INVENTION

The present invention relates to a memory device and particularly to a semiconductor memory device having on the same integrated circuit device a mechanism for reading and writing an entire ATM cell into the memory array in one read or write cycle. The present invention relates also to the semiconductor memory device having multiple ports, i.e., multiple input and output paths, geared towards ATM cell input and output. The present invention relates also to an ATM switch, an ATM cell rate multiplexer and ATM cell rate demultiplexer.

BACKGROUND OF THE INVENTION

The unit of transmission used in the ATM is a cell. An ATM cell contains 53 bytes or 424 bits of information. These cells are transferred at one of the standard transmission rates, e.g., these cells may be transferred at OC-1 (51.84 megabits/second) or OC-3 (155.52 megabits/second) or OC-12 (622.08 megabits/second) or OC-24 (1.244 gigabits/second) or OC-48 (2.488 gigabits/second) and so on. A very high storage capacity and high transfer (input and output) speed storage devices are very much desirable in the ATM network components. The DRAM, Dynamic Random Access Memory, provide lower cost per bit storage capability and provide more memory in the same unit of area compared to most other semiconductor memory devices. For this reason, DRAMs are excellent choice where large quantities of data need to be stored.

There are number of disadvantages of using a DRAM in a conventional way to store ATM cells. One can use the commercially available DRAMs to store the ATM cells but the these DRAMs offer a small number of data input/output pins, e.g., 1, 4, 8, 16 or 18 bits. Therefore, if one desires to construct a cell storage device capable of transferring an entire ATM cell at a time, one has to use many such DRAM chips. For example, using an 8 data bit wide DRAM one has to use at least 53 DRAM chips in parallel.

The speeds at which DRAMs operate, i.e., read/write the external data, are relatively slow. For example, some of the commercially available DRAM chips have memory cycle times of 90, 100, 120, 130 nanoseconds, etc. If one decides to use one such DRAM to store (write) or read an ATM cell, 8 bits at a time, then it would take at least 53 write cycles to store or read the entire cell.

Presently, DRAM memory devices are not commercially available that can read or write an entire ATM cell, in a row of memory array from the external world, in one memory cycle.

The present invention provides a capability of reading or writing an entire ATM cell into a DRAM in one memory cycle and therefore provides a solution for high capacity cell storage and high speed ATM cell input and output with the ATM network external to the integrated circuit device.

SUMMARY OF THE INVENTION

The present invention pertains to an apparatus for manipulating, such as buffering and switching, ATM cells, preferably on an integrated circuit device. The apparatus comprises a memory array in which an entire ATM cell can be read or written in one read or write cycle. The apparatus is also comprised of a mechanism for reading or writing the ATM cell from or into the memory array. Preferably, the ATM cell is read or written from external to the integrated circuit device, into the memory array.

The present invention pertains to a method for switching an ATM cell. The method comprises the steps of receiving the ATM cell at a first input port of a switch from the ATM network. Then there can be the step of storing the ATM cell in one clock cycle in a memory array of the switch. Next there is the step of reading the ATM cell in the memory array in one clock cycle. Next there is the step of transferring the ATM cell from the memory array to a first output port of the switch. Next there is the step of transmitting the ATM cell from the first output port to the ATM network.

The present invention pertains to a switch for an ATM cell. The switch comprises I input ports which receive ATM cells from an ATM network, where I>1 and is an integer. The switch is also comprised of a memory array connected to the I input ports for storing an ATM cell received by one of the I input ports in one clock cycle. The switch also comprises O output ports connected to the memory array, where O>1 and is an integer. One of the O output ports transmit an ATM cell which is received from the memory array to the ATM network. Additionally, the switch comprises a controller connected to the memory array, I input ports and O output ports for controlling the storage of an ATM cell from one of the input ports into the memory array in one clock cycle.

The switch can be used for normal switching operation, multicasting, demultiplexing or multiplexing.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
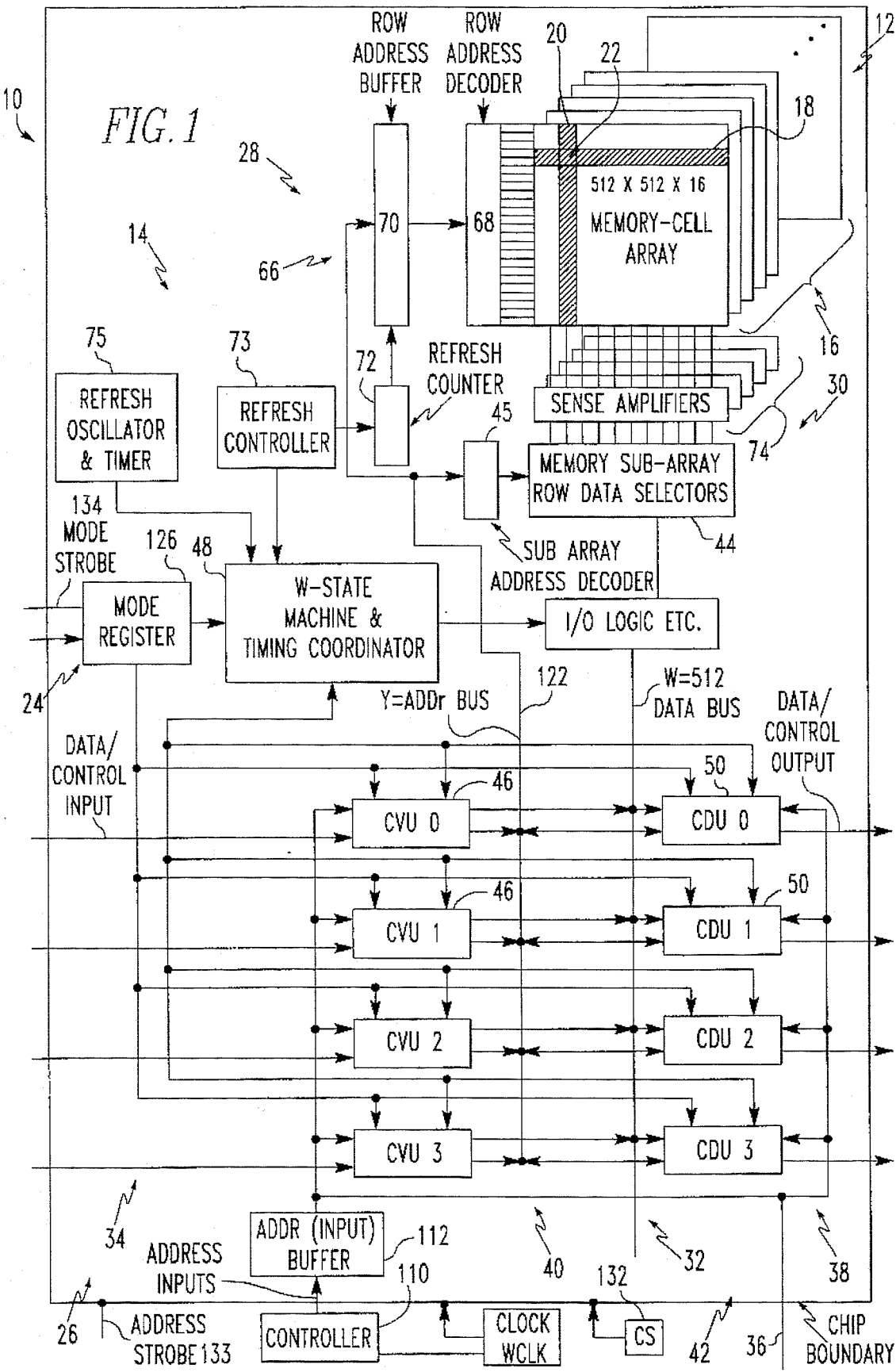
FIG. 1 is a block diagram representation of an apparatus for manipulating ATM cells of the present invention.

Referring now to the drawings wherein like reference, numerals refer to similar or identical parts throughout the several views, and more specifically to FIG. 1 thereof, there is shown an apparatus 10 for manipulating, such as buffering and switching, ATM cells. The apparatus 10 comprises a memory array 12 in which an entire ATM cell can be read or written in one read or write cycle. The apparatus 10 is also comprised of a mechanism 14 for reading or writing the entire ATM cell from or into the memory array 12.

The memory array 12 is preferably comprised of N memory sub-arrays 16, where N>1 and is an integer. Each memory sub-array 16 has rows 18 and columns 20 of memory cells 22, with there being enough memory cells 22 to store all the bits of an ATM cell. At least one row 18 or column 20 can have enough memory cells 22 to store all the bits of an ATM cell. Preferably, each row 18 is RW bits wide and is greater than or equal to the number of bits in an ATM cell. Preferably, each column 20 is CW bits wide, where CW is >1. Preferably, 384 bits<RW<512 bits. Preferably, the memory array 12 is a 4 megabit DRAM having N=16 memory sub-arrays 16 and CW= RW=512 bits. Even though an ATM cell contains 424 bits, the additional 88 bits may be used for application specific data.

The reading or writing mechanism 14 preferably includes a row reading or writing mechanism 24 for reading or writing the ATM cell into a row 18 of the memory array 12. The reading or writing mechanism 14 can also include a mechanism 26 for providing cells to the memory array 12. The providing mechanism 26 is in communication with the row reading or writing mechanism 24. The providing mechanism 26 preferably includes a W bus 32 along which ATM cells travel to the memory array 12.

Additionally, the row reading or writing mechanism 24 can include a row decoder mechanism 28 for decoding and selecting a row 18 of the memory array 12. The row reading or writing mechanism 24 can include a mechanism 30 for selecting a memory sub-array 16 in communication with the memory array 12 and the row decoder mechanism 28. The selecting mechanism 30 preferably includes a memory sub-array row data selector 44 for reading or writing a memory sub-array 16. The W bus 32 is connected to the selecting mechanism 30.

The memory sub-array row data selector 44 is preferably comprised of N pass gate switch arrays 61. Each pass gate switch array 61 is connected to a corresponding memory sub-array 16 of the N memory sub-arrays 16. Each pass gate switch array 61 is also connected to the W bus 32 via I/O logic 63 and to the sub-array address decoder 45. The sub-array address decoder mechanism 45 activates the pass gate switch array 61 connected to the memory sub-array 16 in which the ATM cell is to be written or read. Preferably, each pass gate switch array 61 is comprised of RW pass gate switches 62. Each pass gate switch 62 is connected to a corresponding column 20 of the corresponding memory sub-array 16, and to the sub-array address decoder mechanism 45. The sub-array address decoder mechanism 45 substitutes a column decoder in a conventional DRAM. Note that in FIG. 5a, only one sense of the bit line BL is shown for the sake of simplicity.

The reading or writing mechanism 14 can include a mechanism 34 for delivering ATM cells from an ATM network to the W bus 32. The delivery mechanism 34 is connected to the W bus 32. The delivery mechanism 34 preferably includes a first mechanism 40 for aligning the ATM cell so it is properly ordered to be written into the memory array 12 when it is delivered to the W bus 32. The first mechanism 40 is connected to the W bus 32.

Figure 2:
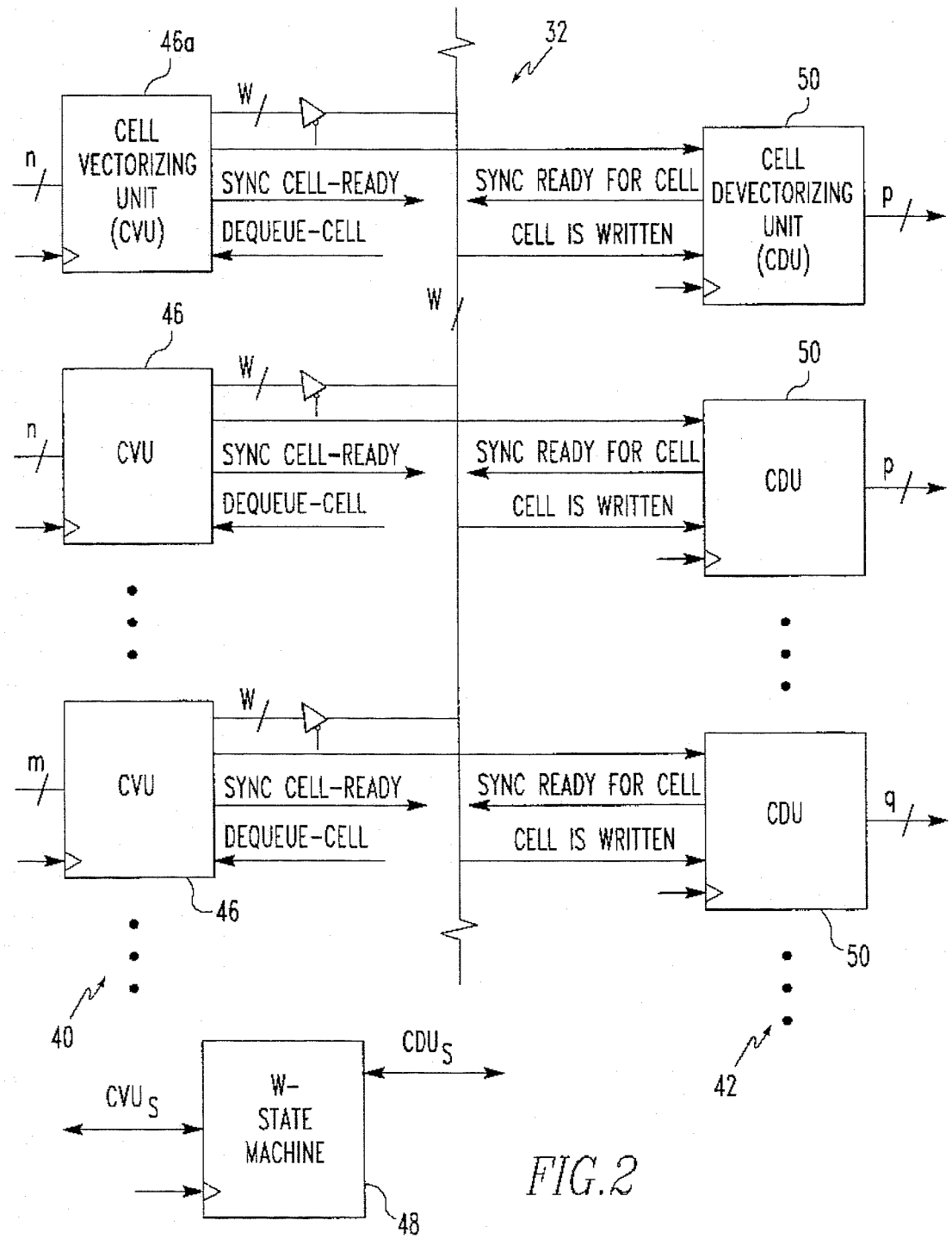
FIG. 2 is a block diagram representation of the CVUs, W bus, CDUs and state machine of the present invention.

The first mechanism 40 preferably includes a plurality of cell vectorizing units 46 which receive bits of a cell from the ATM network 36 and align them so they can be delivered in parallel to the W bus 32. The cell vectorizing units 46 are connected to the W bus 32. The first mechanism 40 preferably also includes a W-state machine 48 connected to the cell vectorizing units 46 to control which cell vectorizing unit 46 delivers its cell to the W bus 32, as shown in FIG. 2.

Additionally, the reading or writing mechanism includes a mechanism 38 for transferring ATM cells from the W bus 32 to an ATM network 36. The transferring mechanism 38 is connected with the W bus 32. The transferring mechanism 38 preferably includes a second mechanism 42 for aligning the ATM cell so it is properly ordered after it is read from the memory array 12 and transferred from the W bus 32 to the ATM network 36. The second mechanism 42 is connected with the W bus 32.

Preferably, the second mechanism 42 includes a plurality of cell devectorizing units 50 which receive bits of a cell from the W bus 32 in parallel and align them so they can be delivered in the ATM cell format to the ATM network 36. (For clarification purposes, the ATM network 36 is defined to be the ATM network external to the chip when the apparatus 10 is on a chip.) The cell devectorizing units 50 are connected to the W bus 32 and the state machine 48. The state machine 48 controls which cell devectorizing unit 50 receives a cell from the W bus 32.

Figure 3:
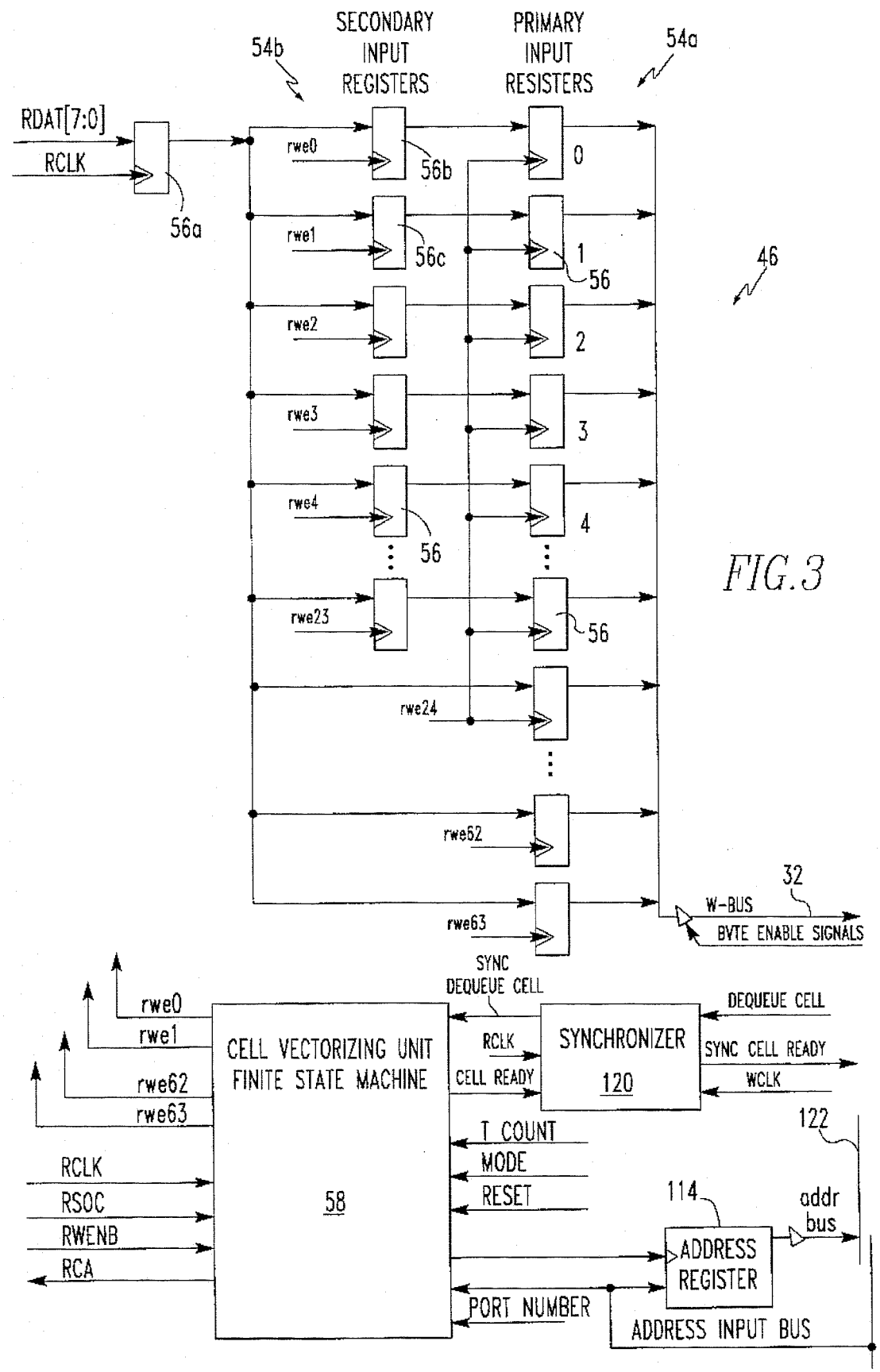
FIG. 3 is a block diagram representation of a cell vectorizing unit.

Each cell vectorizing unit 46 is comprised of at least one layer 54 of a plurality of registers 56 in series which receive the bits of an ATM cell, as shown in FIG. 3. Each cell vectorizing unit 46 is also comprised of a cell vectorizing state machine 58 connected to the registers 56 and the state machine 48. The cell vectorizing state machine 58 controls which bits of the ATM cell go to which register 56, determines when all the bits of an ATM cell are stored in the registers 56, and drives the bits of the ATM cell in the registers 56 to the W bus 32 when the state machine 48 instructs it to do so.

Figure 4:
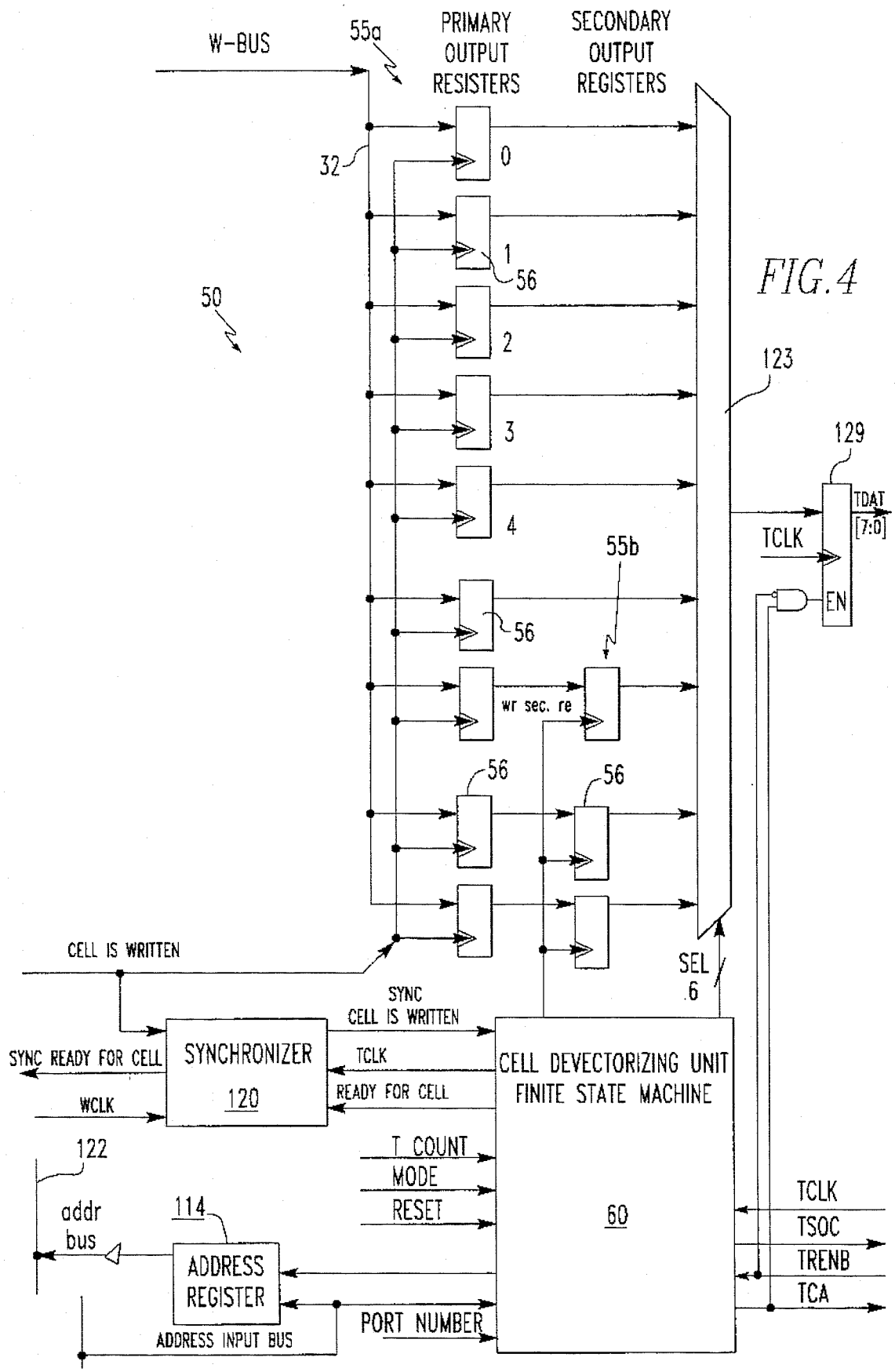
FIG. 4 is a block diagram representation of a cell devectorizing unit.

Preferably, each cell devectorizing unit 50 is comprised of at least one layer 55 of a plurality of registers 56 in series which receive the bits of an ATM cell from the W bus 32, as shown in FIG. 4. The cell devectorizing unit 50 is also comprised of a cell devectorizing state machine 60 connected to the registers 56 and the state machine 48. The cell devectorizing state machine 60 controls which bits of the ATM cell go to which register 56, determines when all the bits of an ATM cell are stored in the registers 56, and drives the bits of the cells in the registers 56 to the ATM network 36.

Figure 6:
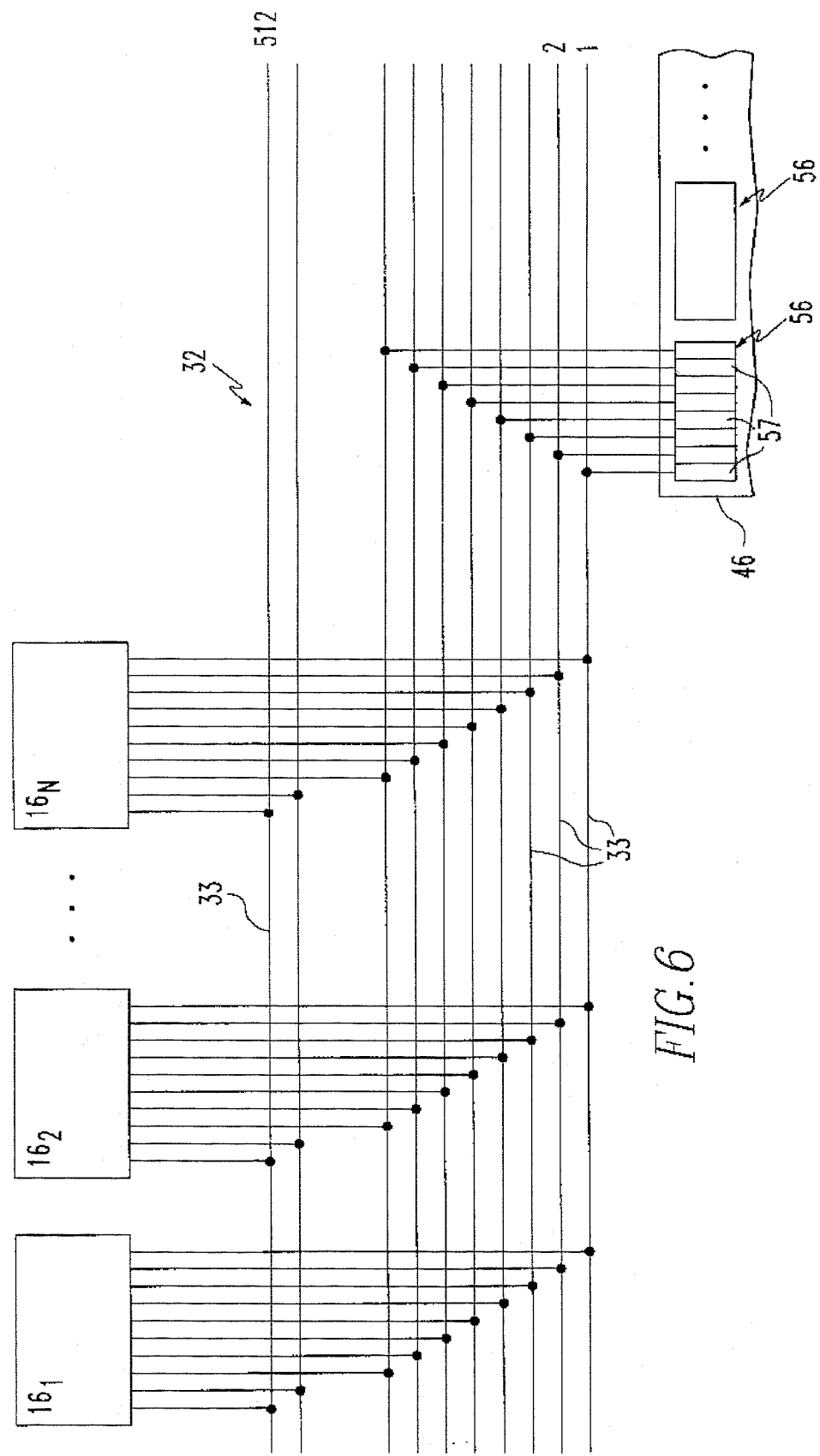
FIG. 6 is a block diagram representation of a CVU connected to memory sub-arrays.

The W bus 32 is comprised of RW bus lines 33. Each bus line 33 is connected to a corresponding I/O logic 63 in each pass gate switch array 61. Each register 56 of the one layer 54 of the cell vectorizing unit 46 and the cell devectorizing unit 50 is an 8-bit register having 8 register cells 57, as shown in FIG. 6. Each register cell 57 holds a bit. Each register cell 57 is connected to a corresponding bus line 33 of the W bus 32.

In the operation of the invention, an ATM cell from an ATM network 36 is received by a CVU 46a, as shown in FIG. 1. The ATM cell on the network 36 is directed to the CVU 46a from a corresponding ATM physical layer part (not shown). The CVU state machine 58 is connected to the ATM network 36 and operates based on the ATM network 36 interface timing. This timing is identified to the CVU state machine 58 through a RCLK signal which is received by CVU state machine 58. The RCLK signal is produced from the ATM physical layer interface. The components of the apparatus 10, such as the CVU state machine 58 and the registers 56 in the CVU 46 operate based on the timing of the ATM network 36. Preferably, they operate based on the rising edge of the RCLK signal.

There is received by the CVU state machine 58, in conjunction with the first byte of the cell is being received by a first register 56a of the CVU 46a, an RSOC signal. The RSOC signal is the receive start of cell signal that identifies to the CVU state machine 58 that the first byte of the cell has arrived at the CVU 46a. The RSOC signal is active at the same time the first byte of cell data on a RDAT signal is received. The RSOC signal is inactive while the other bytes of the cell are received by the CVU 46a. It is ignored when the RWENB signal is inactive.

The RDAT signal, or the receive data signal corresponding to the ATM cell data that is arriving from the ATM network 36, is a signal that carries the data that is written into the CVU 46a. The RDAT signal is sampled on the rising edge of the RCLK signal when the RWENB signal is active and the RCA signal is true. Each register 56 and the CVU state machine 58 of the CVU 46 receives the RCLK signal for timing purposes. It should be noted in this context, ATM cell data means header as well as payload, although it could be just the payload.

While the CVU 46 is receiving the ATM cell, the RWENB signal is also received by the CVU state machine 58. The RWENB signal is the receive write enable and is active when it is low. The RWENB signal is used to indicate on which rising edges of the RCLK signal the CVU 46a should accept another byte of data on the RDAT signal. Thus, the RWENB signal indicates that there is a bit of a cell to be received by the CVU 46. In order for the bit to be received, not only does the RWENB signal need to be active low, which means that there are bits to be stored in the CVU 46a, but an RCA signal which is sent to the external device that is sending the ATM cell and the RSOC signal, the RDAT signal, the RWENB signal and the RCLK signal, must have indication from the RCA signal of the CVU state machine 58 that the CVU is accepting cell data. The RCA is a receive cell available signal. When the RCA signal is high or active another byte of cell data will be accepted by the CVU 46. It is low or inactive when writing another byte of data will overwrite data from a previous cell that has not been written to the memory array 12 yet. All of these signals operate on a per clock cycle basis and thus each byte of data is under specific control as to whether it should be entered to the CVU 46 or not. Thus, the RCLK signal provides timing for the CVU 46, the RSOC signal identifies the first byte of an ATM cell that arrives (this is helpful in alignment and timing purposes also since if some portion of ATM cell is lost, the CVU can identify when to start over again with a new ATM cell by the RSOC signal), the RWENB signal alerts the CVU 46 that there are bytes of a cell ready to be sent, and the RCA signal indicates that the CVU 46 is receptive to receiving a cell. The RDAT signal is essentially the data of the ATM cell.

The CVU 46a has a first register 56a which is an 8 bit register, as shown in FIG. 3. The first register 56a receives the first 8 bits of the cell. The first register 56a is in communication with the CVU state machine 58. The CVU state machine 58 controls the operation of the first CVU 46a through the signals, such as the RCA signal.

When the first register 56a has received 8 bits from the ATM cell, the CVU state machine 58 directs the 8 bits in the first register 56a to be released and transferred to a second register 56b. At the same time, the CVU state machine 58 records the fact by incrementing an internal counter that the first 8 bits of the ATM cell have been transferred through to the second register 56b.

After the first 8 bits of the ATM cell have been transferred from the first register 56a to the second register 56b, the next 8 bits of the ATM cell are received by the first register 56a. Then, the CVU state machine 58 releases the second 8 bits of the ATM cell and transfers them to the third register 56c. At the same time, the CVU state machine 58 records the fact by incrementing the internal counter that the next 8 bits of the ATM cell have been transferred to the third register 56c. This operation repeats itself until all the registers 56 in the second layer 54b in the first CVU 46a have been filled. After the registers 56 in the second layer 54b are filled with bits of the ATM cell, in the next clock cycle, all the remaining bits in all the registers 56 of the second layer 54b are transferred at the same time to the corresponding registers 56 in the first layer 54a of registers. The remaining bits of the ATM cell are written into the remaining registers 56 of the first layer 54a, as described above. In this way, when the bits of the entire ATM cell are in the registers 56 of the first layer 54a, the CVU 46a can continue receiving a new ATM cell by storing its bits in the registers 56 of the second layer 54b. As long as the registers 56 of the first layer 54a have released their bits before the registers in the second layer 54b are filled, the CVU 46a can operate essentially continuously as described above.

The external controller 110 provides address inputs to an address buffer 112. The address buffer 112 is connected to each CVU 46 and each CDU 50. As each CVU 46 has its registers 56 filled with the bits of an ATM cell from the network 36, an address register 114 and the CVU state machine 56 in the respective CVU 46 receives the address information from the address buffer 112.

When the CVU state machine 58 receives the instructions from the W-state machine 48 to release the bits of the ATM cell from the registers 56, not only do the bits go to the respective bus lines 33, but the address register releases its bits to the address bus 122 that is connected to the row address buffer 70 and the memory sub-array row data selector 44. The address information that travels on the address bus 122 identifies where in the memory array 12 the bits of the ATM cell are to be stored. The address information has three parts to it. It has row address, sub-array address and port number. Assuming a 4 megabit DRAM, with 16 sub-arrays, the address will look like: Row address of 9 bits and sub-array address of 4 bits and port number of 3 bits.

Each CVU 46 and CDU 50 is hard coded with a port number. These encodings are as follows.

| 000 | CVU0 |
|-----|------|
| 001 | CVU1 |
| 010 | CVU2 |
| 011 | CVU3 |
| 100 | CDU0 |
| 101 | CDU1 |
| 110 | CDU2 |
| 111 | CDU3 |

Along with the address information, the external controller 110 provides an address_strobe signal 133. Additionally, there is a chip_select input 132. The chip_select signal along with the address_strobe signal 133 controls the selective operation of the CVUs or CDUs. The external controller 110 sends the address information and the chip_select signal and then sends the address_strobe signal. All the CVUs or CDUs compare their own port number to that in the address information. If the two port numbers match, then the address is written into the local address register 114 by the address_strobe, provided the chip_select signal 132 is active. If the port numbers match and the chip_select 132 is not active, then the currently received data in the ATM cell is rejected and the CVU or the CDU starts processing the next ATM cell.

A CVU 46 asserts the cell_ready signal only when the entire ATM cell is constructed in the first row 54a of registers 56 and the address is available in the address register 114. The cell ready signal indicates to the W-state machine 48 that the ATM cell data and address is available. A CDU 50 asserts a ready_for_cell signal when the address is available in the address register 114. The ready_for_cell signal indicates to the W-state machine 48 that the ATM cell data is needed from the address location.

When the first layer 54 of registers 56 are filled with all the bits from the ATM cell and the address register 114 in the CVU 46 has received the address of the location where the ATM cell is to be stored in the memory array 12, the CVU state machine 58 informs the W-state machine 48 that the ATM cell stored in the first CVU 46a is ready for transfer to the memory array 12. The CVU state machine 58 knows the CVU 46a is filled with all the bits of the ATM cell since it has kept count of the bits that have passed through the first register 56a and knows how many bits are in an ATM cell, as well as the CVU state machine 58 knows that the proper address is received.

When the CVU 46 has stored an entire ATM cell in the registers 56 of the first layer 54a, the CVU state machine 58 sends a cell ready signal to the synchronizer 120. The synchronizer 120 synchronizes the cell ready signal from RCLK domain to WCLK domain. The WCLK signal is a timing signal from and controlled by the external controller 110. The synchronizer is necessary so that the various signals passed between the W-state machine 48 and the CVU state machine 58, which operate at different clock frequencies, can be understood by each other. The synchronizer 120 after it receives the cell ready signal from the CVU state machine 58 sends a synchronized cell ready signal to the W-state machine 48. When the W-state machine 48 receives the sync cell ready signal from the synchronizer 120, informing it that the CVU 46a is ready to release its cell to the W bus 32, the W-state machine 48 determines whether it is the appropriate time for the transfer of the ATM cell from the CVU 46a to the W bus 32. When the W-state machine 48 deems it appropriate to transfer the ATM cell from the CVU 46a to the W bus 32, the W state machine 48 sends a dequeue cell signal to the synchronizer 120. The synchronizer 120 takes the dequeue cell signal from the W-state machine 48 and synchronizes it to the RCLK. The synchronizer 120 then sends a sync dequeue cell signal to the CVU state machine 58 informing the CVU state machine that the bits from the first layer 54 of registers 56 have been used and the first layer 54 of register 56 is now ready to receive data from the next ATM cell.

The CVU state machine 58 also receives a T-count signal which essentially identifies the length of a cell it is going to receive, a mode signal from the mode register 126 which identifies how the CVU 46 corresponding with the CVU state machine 58 is to operate, and a reset signal to clear and initialize the CVU state machine 58.

As mentioned above, in the event another ATM cell arrives at the first CVU 46a before the first ATM cell stored in the first layer 54 of registers 56 have been released to the W bus 32 for transfer to the memory array 12, there is a second layer 54b of registers that are separated from the W bus 32 by the first layer 54a of registers 56. By having the second layer 54b of registers 56 present, it prevents ATM cells from being lost that come to CVU 46a because there is no place for such a cell to be stored. This second layer 54b of registers 56, as well as any additional layers 54 that may be required in order not to overflow the CVU 46 is given by the following.

$$\frac{T}{t} \times ((n-1) + \text{refresh}) \times b)$$

where b is the number of bits that arrive in each RCLK clock period at the CVU 46, T= DRAM read/write cycle clock period, t=interface clock, RCLK, period, N= number of CVUs and CDUs and refresh= refresh time needed in terms of T; generally 1. The above number is referred to as secondary storage register number. There is an assumption in the above equation that the refresh cycles are evenly distributed over the refresh time. If a burst of refresh is performed, the secondary storage register number becomes too high.

As cells arrive at the various CVUs 46, the filling of the CVU 46 is repeated as described above. As the CVUs 46 receive address and cells and are aligned and ready to transfer their cells to the W bus 32 for ultimate delivery to the memory array 12, they are continuously informing the W-state machine 48 of their status. The W-state machine 48 maintains the organization of when the cells that are ready to be transferred to the W bus 32 are actually transferred by controlling tri-state enable so there is no competition or corruption of the cells. The W-stage machine 48 arbitrates between the CVUs and CDUs that are competing for the cell transfer over the W bus by an arbitration scheme, for example, a simple round robin scheme. When the W-state machine 48 decides that it is time to transfer a cell from a CVU 46 to the memory array 12, the W-state machine 48 enables the tri-state buffers of address and data, and also generates RAS, CAS related clock signals. The W-state machine causes the CVU 46 to release its cell to the W bus 32 in such a manner that cells arriving at the CVUs 46 from the ATM network 32 always have a place to be stored in a CVU 46 because there can be a cell being transferred from a CVU 46 to the W bus 32 as another cell is arriving at a CVU 46 from the ATM network 36.

Figure 5A:
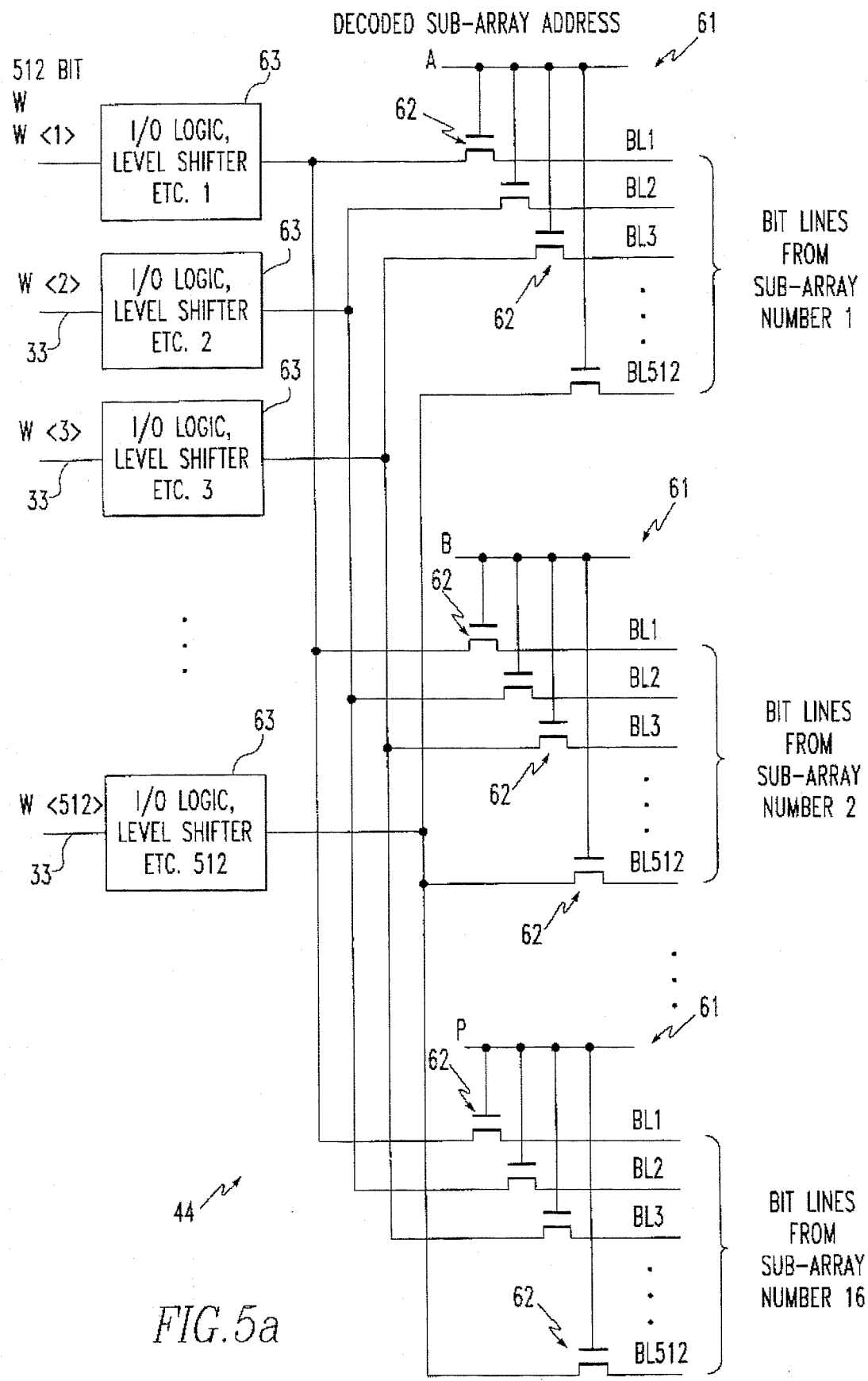
FIG. 5a is a block diagram representation of a memory sub-array row data selector and I/O logic.

The ATM cell after it is transferred to the W bus 32, travels along the W bus 32 to the I/O logic and then to the memory sub-array row data selector 44. The memory sub-array row data selector 44, as shown in FIG. 5a, is comprised of 16 pass gate switch arrays 61, each of which has 512 (RW) pass gate switches 62. Each pass gate switch 62 is connected to a bit line of a sub-array 16. The memory array 12 is a DRAM such as a Toshiba TC524162 DRAM having a size of 4 megabit (16×512×512 bits). As the ATM cell arrives at the array data selector 44, each bit is essentially traveling in parallel with the other bits of the cell along the W bus 32 until each bit goes to a corresponding pass gate switch 62. Thus, the first bit of the ATM cell goes to the first pass gate switch 62a, the second bit of the ATM cell goes to the second pass gate switch 62a and so on for all the bits of the ATM cell.

The row decoder mechanism 28 is comprised of a row address decoder 68 that decodes the row address and therefore selects a row 18 in each sub-array 16 for purposes of storing the cell in a memory cell 22 in the desired row 18. There is also a row address buffer which drives the row address of interest; and a refresh counter 72, refresh controller 73 connected to the refresh counter 72 and the W-state machine 48, and a refresh timer 75 that is clocked by the WCLK signal connected to the W-state machine 48 to provide the refresh to the memory cells 22. The operation of the row address decoder 68, the row address buffer 70, the refresh counter 72 the refresh controller 73, and the refresh timer 75, are well known in the art. See U.S. Pat. No. 5,305,280, incorporated by reference, for description of the ROW decoder and "Dynamic RAMs and Memory Modules" databook by Motorola, Inc., 1994, incorporated by reference. Essentially, the selection and decode of a row 18 is performed as in a conventional DRAM.

The sub-array decoder 45 receives the sub-array address and it decodes the sub-array address. The information from the sub-array address decoder is connected to the memory sub-array data selector 44. The signals from sub-array address decoder 45 are essentially connected to each pass gate switch 62 to place an enable on signal onto each desired pass gate switch 62 to allow the bit from the I/O logic to pass through the pass gate switch 62 to the bit lines of a corresponding sub-array 16 where the bit is ultimately stored in a memory cell 22. Thus, the I/O logic passes its respective bit to a corresponding pass gate switch 62 for each sub-array 16. The sub-array 16 and specifically the memory cell 22 in the sub-array 16 that the bit ultimately is stored in is determined by which pass gate switch 62 of which pass gate switch array 61 receives an enable on signal from the sub-array address decoder 45 to allow the bit to transfer through the pass gate switch 62 by being provided to the bit lines of a memory sub-array 16. After the bit passes through the pass gate switch 62, it goes to a sense amplifier 74 corresponding to a sub-array 16 and ultimately to the memory cell 22 where it is to be stored as is well known in the art. Essentially, the column decode operation in a conventional DRAM is replaced by the memory sub-array row data selector 44. Instead of a column address as is found in a conventional DRAM, there is a sub-array address provided. This operation is done for every bit of the ATM cell and thus the entire cell is stored in the memory array 22 along a given row 18.

When the bits of the ATM cell arrive at the memory sub-array row data selector 44, each of the bits go to their respective I/O logic and to each of the pass gate switch arrays 61 and specifically to a corresponding pass gate switch 62 therein. The sub-array address decoder 45 has activated only the desired one of the pass gate switch array 61 which are connected to the corresponding sub-array 16 where the bits are ultimately written. If all the bits of the ATM cell are to be written into a single sub-array 16, then none of the other pass gate arrays 61 are activated by the sub-array address decoder 45 so none of the bits are written in the wrong memory cell 22 in the memory array 12.

Figure 5B:
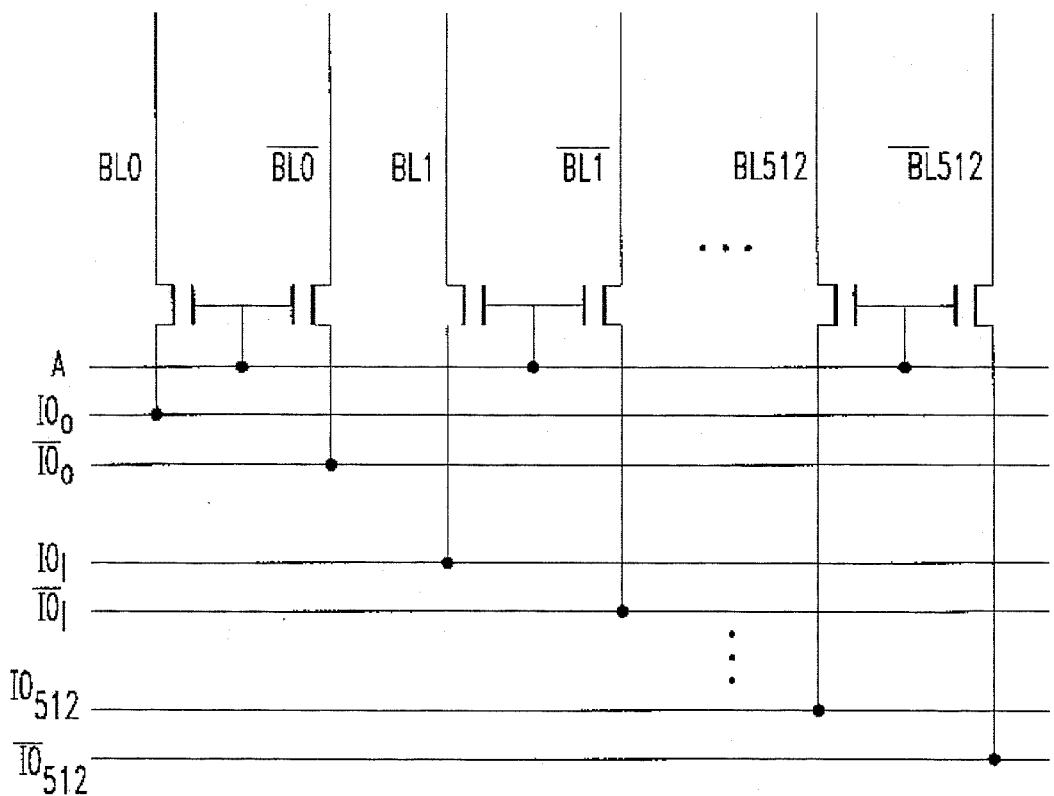
FIG. 5b is a block diagram representation of a portion of the memory sub-array row data selector.

All the columns of the memory sub-array row data selector 44 corresponding to a memory sub-array 16 have a single common control signal, for instance, a, b, c . . . etc. which, when received, enables the data corresponding to that memory sub-array 16 to be sourced on the I/O bus through the pass gate array 61. In this way, a single control signal activates the entire portion of the memory sub-array row data selector 44 that connects to the corresponding memory sub-array 16, as shown in FIG. 5a so the ATM cell can be written into the memory sub-array 16. FIG. 5b shows a schematic representation of a single pass gate switch array 61 of the sub-array data selector 44 connected to a memory sub-array 16 of the memory array 12.

Integrated circuit memories generally contain a two-dimensional array of storage cells arranged in rows and columns. A common architecture is to connect all cells in a row to a common row line, often referred to as the "word line" and all cells in a column to a common column line often called the "bit line" or "digit line". In this architecture, the row line provides a signal which enables cells to receive or output a data signal and the column line provides the input or output line on which the signal is transferred. An individual cell is addressed via a row decoder that selects a row to be addressed and a column decoder which selects a column to be addressed, thereby selecting one particular cell at the corresponding row and column location. The cell is accessed by placing an enable signal on the row line in the row associated with the cell and reading or writing a signal on the column line associated with the cell.

In regard to the sense amplifier 74, integrated circuit memories are also generally binary logic circuits in which information is stored and transferred as voltages representing complementary logic values that are alternately referred to as "true and false" "logic 1 and logic 0" or "logic high and logic low". Typically, a voltage of 5 volts may represent the logic 1 state while a voltage of zero volts represents the logic 0 state. Because of the constraints of resistance, capacitance, etc., the individual voltages input to or output on the column lines by individual cells are usually at some intermediate voltage. Thus, subcircuits are associated with the column lines of integrated circuit memories to pull the high voltage values up to, or as close as possible to, the full logic 1 voltage, for example, 5 volts, and to pull the low voltages down to as close to the logic 0 voltage, for example, 0 volts, as possible. These subcircuits are commonly referred to as sense amplifiers. See pages 143 to 161 of Circuits, Interconnections, and Packaging for VLSI by H.B. Bakoglu, Addison-Wesley Publishing Company, Inc., 1990; and application note 53 in Memory Products Data Book Volume 1 of 2 (Document No. 60105-1-V1) by NEC Electronics, Inc. 1993, both of which are incorporated by reference.

In a read operation, the bits of an ATM cell in a row 18 essentially follow the reverse process for writing or storage. In the read operation, the bits in a row 18, i.e., 512 bits of data, from each of the 16 sub-array 16 is muxed and only 1 of the 16 rows 18 are selected and provided to the W bus 32.

After all the bits of a cell are read from the memory array 12, they are provided back to the W bus 32 where they travel to the cell devectorizing unit (CDU) 50. The CDU 50 they go to is dictated by the W-state machine 48 which is connected to each CDU 50. When the CDU 50 receives the cell, the cell is segmented into 8 bits and placed into registers 56 in the CDU 50. Registers in register 56 are grouped as 8-bit registers.

When CDU 50 receives an address from the external controller 110 to read data from a particular location, it is ready to receive an ATM cell. When a CDU 50 is ready to receive a cell, the CDU state machine 60 sends a ready__for__cell signal to synchronizer 120. The synchronizer 120 also receives a TCLK signal identifying the timing of the ATM network 36 interface which is the basis for the timing of the CDU state machine 60. The synchronizer 120 takes the ready__for__cell signal and the TCLK signal and produces a sync ready for cell signal, synchronized to WCLK, that is sent to the W-state machine 48. The synchronizer also receives a WCLK signal that is produced by the WCLK signal that identifies the timing of the W bus 32 and the W-state machine 48. As explained above, the synchronizer 120 synchronizes signals between the two different clock domains so that the CDU state machine 60 and the W-state machine 48 can understand the signals they send to each other.

After the W-state machine 48 receives the sync ready for cell signal from the synchronizer 120 of the CDU 60, when the W-state machine 48 determines by the arbitration scheme, it causes the address information from the address register 114 of the CDU 60 to be provided to row data selector 44 and the row decoder 68. As explained above, the row data selector 44 and the row decoder 68 cause the bits of the ATM cell that is desired to be transferred to the CDU 60 to be read out of the memory sub-array 16 in which the cell is stored. The transfer of the bits of the ATM cell from the memory sub-array 16 is the opposite procedure that occurs for a write operation as described above. The address register 114 has previously received the address information from the external controller 110. The address information travels to the address register 114 and to the memory sub-array row data selector 44 and the row decoder 68 and row address buffer 70 by way of the address bus 122. The address register 114 and the CDU state machine 60 both receive the address information.

When the bits of the ATM cell are read from the memory sub-array 16, they are transferred to the respective bus lines 33 of the W bus 32 and travel to the CDU 60. At the same time the bits of the ATM cell are traveling on the W bus 32, the W-state machine 48 has sent a cell_is_written signal to the synchronizer 120. The synchronizer 120 produces a sync_cell_is_written signal that is corresponding to the TCLK timing of the ATM network 36 interface. By being converted to this timing, the sync cell is written signal is understood by the CDU state machine 60 when it receives a signal. At the same time, the sync cell is written signal is also provided to the respective registers 56 in the first layer 54 of registers 56 and the CDU 60. The cell is written signal serves to activate these registers 56 in the first layer 54a so that the bits on the W bus 32 are all read into the respective register cells 57 of registers 56. Since each register cell 57 is connected to a unique bus line 33 of the W bus, all the bits of the ATM cell are written to the respective register cells 57 at the same time.

After the CDU state machine 60 has selected the bits from the registers 56 of the first layer 54a to the point where the remaining bits in the registers 56 of the first layer 54a correspond to the registers 56 of the second layer 54b, all the remaining bits and all the remaining registers 56 of the first layer 54a transfer in the same clock cycle to the corresponding registers 56 and the second layer 54a. In this way, the entire first layer 54a of registers 56 becomes clear to receive the next ATM cell. At the same time, the select signal from the CDU state machine 60 still continues to receive the remaining bytes in their order of the ATM cell, but now the select signal is reading the bytes from the second layer 54b of registers 56. After the remaining bits of the cell in the first layer 54a of registers 56 is transferred to the second layer 54b of registers 56, the CDU state machine 60 sends the ready for cell signal to the synchronizer 120 to begin the process again, provided it has received a new read address. The length of the first layer 54a of registers 56 minus the second layer 54b of registers 56 can be computed by the formula mentioned earlier.

After all of the bits of the ATM cell are stored in the registers 56 of the first layer 54a, the CDU state machine 60 begins at the first byte of the cell in the register 56 connected to a 64 to 1 by 8 mux 123. The CDU state machine 60 sends a select signal which causes the mux to read the first byte of the ATM cell and passes it to a register 129 to form the TDAT signal. The register 129 also receives the TCLK signal and an enable signal which only enables the register 129 when the TRENB signal is active and the TCA signal is active. Each clock cycle of the TCLK signal causes the CDU state machine 60 to produce the select signal for the next byte in the ATM cell, provided TRENB and TCA are active. The next byte passes through the mux 123 to the register 129. Since this occurs each clock cycle in regard to each byte, there can be control over the movement of each byte. In regard to the aforementioned signals, the TCLK signal is supplied from the external device and all other signals in the CDU are synchronous to the rising edge of this TCLK signal. The TRENB signal is a transmit read enable signal that indicates that the external device is receptive and ready to receive the ATM cell byte. The transmit read enable or TRENB signal is active when it is low. It is used to indicate on which rising edges of the TCLK signal the CDU 60 should issue another byte of data on the TDAT signal. When the TRENB signal is sampled low by the TCLK signal, another byte of data will be available on the next rising edge of the TCLK signal. At maximum transfer speeds, the TRENB signal will be low for the entire duration of a cell transfer and a new byte of data is available on every rising edge of the TCLK signal. The TRENB signal is ignored when the TCA signal is low. The TCA signal is produced by the CDU state machine 60 and identifies that there is cell available for transmission by the CDU 60. There is also a TSOC signal that is sent by the CDU state machine 60. The TSOC signal indicates a transmit start of cell by the CDU 60. The TSOC signal is high at the same time as the first byte of a cell is available on the TDAT signal. It is useful for timing purposes in the event that there is error in the transmission of a cell, and the external device knows when a new cell is beginning to be transmitted. The TDAT signal is produced by the CDU 60. The TDAT signal is the data that is transmitted and has the ATM cell bits. The data is written to the register 129, and sampled on the rising edge of the TCLK signal when the TRENB signal is active (and the TCA signal is high).

In one embodiment, each register cell 57 of a register 56 of a first layer 54a is connected to a corresponding bus line 33, as shown in FIG. 6. If there are 512 bus lines 33, one bus line for each bit of the ATM cell, then there is a unique bus line 33 for each register cell 57 of each register 56 of the first layer 54a of a CVU 46.

In one embodiment, memory bank interleaving may be used. Memory bank interleaving is well understood and often used by those skilled in the art. In two-way interleaving, the memory array 12 is divided into two banks, each containing either 16 half (256 rows by 512 columns) memory sub-arrays or 8 (512 rows by 512 columns) memory sub-arrays. The first half of ATM cell (24 bytes) from CVUs is written into one memory bank and the second half of ATM cell (24 bytes) from CVUs is written into another memory bank. This is done in such a way that the two memory cycles overlap with one another without conflicting the data on the W bus 32. This kind of two-way memory interleaving has an advantage that it allows for W bus 32 width reduction by half (256 bits). If four-way interleaving is designed, then the width of the W bus 32 can be reduced two-fold (128 bits). The memory bank interleaving has also the advantage of hiding the memory precharge time.

Another way memory interleaving can be designed to increase the bandwidth of the W bus 32. In this case, assuming two-way interleaving, the memory array 12 is divided into two banks, each consisting of 8 (512 rows by 512 columns) memory sub-arrays 16. The W bus 32 width is not reduced but the W bus bandwidth is increased up to twice the original bandwidth. In this case, complete ATM cells are read or written in the alternate banks.

In all the above cases of interleaving memory banks, additional burden is placed on the W-state machine 48. The W-state machine 48 has to provide separate RAS, CAS, etc. clock signals to each memory bank, also it has to provide separate address lines to row decoder 68 and sub-array address decoder 45. The W-state machine 48 has to control the data output each bank and also the CVUs such that data conflicts do not occur on the W bus 32. There are many other ways of designing the memory bank interleaving. Some of these can be found in the reference mentioned below.

Figure 7:
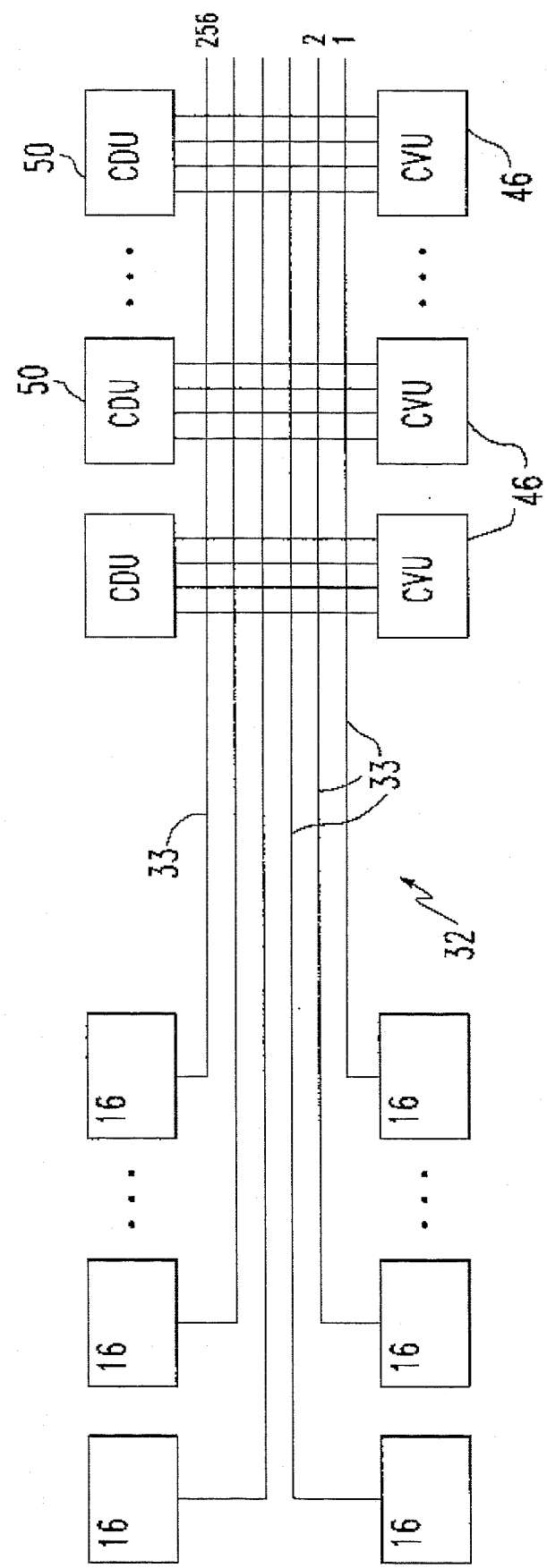
FIG. 7 is a block diagram representation of CVUs and CDUs connected to memory sub-arrays through two-way interleaving and piecewise reading and writing.

If interleaving is utilized, then a register cell 57 may be connected to a bus line 33 to which at least one or more additional register cells 57 are connected. If two-way interleaving is utilized, then there may be two register cells 57 connected to each bus line 33, there being only 256 bus lines 33 instead of 512 bus lines, as shown in FIG. 7. If four-way interleaving is used, then there can be four register cells 57 connected to each bus line 33, there being 128 bus lines 33. When interleaving is used, then the state machine 48 controls the respective CVU state machine to only allow certain registers 56 to release their bits of the ATM cell at the proper time so all the bits of the ATM cell are still provided to the memory array 12, but they are released over time instead of all at once to the bus lines 33 of the W bus 32.

If interleaving occurs, then all the bits can still be written through one pass gate switch array 61 corresponding to one memory sub-array 16. In the event of interleaving, since there may be fewer bus lines, there also are correspondingly fewer I/O logics and pass gate switches 62 in each pass gate switch array 61. This is because there are fewer signals coming in at any given time that need to be processed by the pass gate switches 62. Depending on the type of interleaving, there would be the same number of I/O logics and pass gate switches 62 in each pass gate switch array 61 as there are bus lines 33 in the W bus 32.

In the read operation, the process described above is essentially reversed for the bits of the ATM cell to ultimately reach the register cells 57 of the registers 56 of a CDU 50. A discussion about DRAM interleaving can be found in:

EDN Mar. 30, 1989 pages 155 to 166;
EDN Apr. 13, 1989 pages 157 to 164;
EDN Apr. 27, 1989 pages 183 to 188;
EDN May 11, 1989 pages 179 to 186; all of which are incorporated by reference The apparatus 10 can also be used as a switch, cell rate multiplexer or cell rate demultiplexer. The mode in which the apparatus 10 is used is determined by the mode register 126. The mode register 128 is connected to the W-state machine 48 the CVUs 46 and the CDUs 50 to allow them to carry out the transfer of the cells according to the mode designated by the mode register 126. The mode register 126 can control whether the CVUs 46 operate individually, all together, or in various groupings. Similarly, the mode register 126 also controls the CDUs 50 to cause them to operate individually, all together or in groupings.

The mode register 126 receives mode information from an external pin or pins. This information is written into the mode register 126 by a mode_strobe 134 signal pin. The mode register 126 is loaded with the information before the operation of the apparatus 10 begins, e.g., at the initialization time. The mode register 126 is not changed during the operation of the apparatus.

Furthermore, depending on the coding, the mode register would specifically indicate how to structure the relationship between the CVUs and CDUs. For CVUs, the mode register specifies following encodings.

000 All the four CVUs working individually.
001 CVU0, CVU1 are grouped together. CVU2, CVU3 working individually.
010 CVU2, CVU3 are grouped together. CVU0, CVU1 working individually.
011 CVU0, CVU1 are grouped together. CVU2, CVU3 grouped together.
100 All the CVUs grouped together.

Similarly, for CDUs, the mode register specifies following encodings.

000 All the four CDUs working individually.
001 CDU0, CDU1 are grouped together. CDU2, CDU3 working individually.
010 CDU2, CDU3 are grouped together. CDU0, CDU1 working individually.
011 CDU0, CDU1 are grouped together. CDU2, CDU3 grouped together.
100 All the CDUs grouped together.

Along with the mode of operation information the mode register 126 contains T-count information for each CVU 46. The T-count information is five bits wide and it indicates to the CVU the length of the ATM cell data and any additional data that need to be stored in terms of bytes. The T-count can have the following decodings:

| | |
|---|---|
| 00000 | 48 bytes |
| 00001 | 49 bytes |
| 00010 | 50 bytes |
| 00011 | 51 bytes |
| 00100 | 52 bytes |
| 00101 | 53 bytes |
| 00110 | 54 bytes |
| 00111 | 55 bytes |
| 01000 | 56 bytes |
| 01001 | 57 bytes |
| 01010 | 58 bytes |
| 01011 | 59 bytes |
| 01100 | 60 bytes |
| 01101 | 61 bytes |
| 01110 | 62 bytes |
| 01111 | 63 bytes |
| 10000 | 64 bytes |

Thus, for the CVUs the mode register contains 23 bits of information; 3 bits specifying the mode of operation and 5 bits of T-count for each CVU.

Along with the mode of operation information the mode register contains T-count information for each CDU 50. The T-count information is five bits wide and it indicates the CDU 50 the length of the ATM cell data and any additional data that will be received from W bus in terms of bytes. The T-count can have following encodings:

| | |
|---|---|
| 00000 | 48 bytes |
| 00001 | 49 bytes |
| 00010 | 50 bytes |
| 00011 | 51 bytes |
| 00100 | 52 bytes |
| 00101 | 53 bytes |
| 00110 | 54 bytes |
| 00111 | 55 bytes |
| 01000 | 56 bytes |
| 01001 | 57 bytes |
| 01010 | 58 bytes |
| 01011 | 59 bytes |
| 01100 | 60 bytes |
| 01101 | 61 bytes |
| 01110 | 62 bytes |
| 01111 | 63 bytes |
| 10000 | 64 bytes |

Thus, for the CDUs the mode register contains 23 bits of information. 3 bits specifying the mode of operation and 5 bits of T-count for each CDU 50. Therefore, in this embodiment, the mode register 126 contains 46 bits of information.

The mode register 126 causes the apparatus 10 to operate as a switch, a cell rate multiplexer or a cell rate demultiplexer. Following are some examples of their operation in various modes.

In one example of 4×4 switch operation, CVU mode 000 and CDU mode 000, the apparatus 10 receives ATM cells on four inputs at 155 megabits (OC-3) input rate, stores the ATM cells into the memory array 12 and then reads the ATM cells on W bus 32 as requested by the CDUs. Then the CDU 50 send the ATM cells on the corresponding output port.

In one example of the cell rate multiplexer operation, CVU mode 000, CDU mode 100, the apparatus 10 takes ATM cells on four inputs at 155 Megabits (OC-3) inputs rate and outputs ATM cells at 622 Megabits (OC-12) rate. In this case, each CVU 46 receives a complete ATM cell and writes it into the memory array 12. When the cell is received by the CDU 50, the ¼ cell is written to each CDU 50 in the following way.

Byte 1 is written into first layer of output register 0 of CDU0.
Byte 2 is written into first layer of output register 1 of CDU1.
Byte 3 is written into first layer of output register 2 of CDU2.
Byte 4 is written into first layer of output register 3 of CDU3.
Byte 5 is written into first layer of output register 4 of CDU0.
Byte 6 is written into first layer of output register 5 of CDU1.
Byte 7 is written into first layer of output register 6 of CDU2.
Byte 8 is written into first layer of output register 7 of CDU3.
and so on.

In case the CDU outputs ATM cells on a 4 byte wide path at 622 Megabits (OC-12).

In one example of the cell rate demultiplexer operation, CVU mode 001, CDU mode 000, the apparatus 10 takes ATM cells at 622 Megabits (OC-12) input rate and outputs ATM cells at 155 Megabits (OC-3) rate over four outputs. In this case, each CVU 46 receives a ¼ ATM cell as shown below.

Byte 1 is written into first layer of input register 0 of CDU0.
Byte 2 is written into first layer of input register 1 of CDU1.
Byte 3 is written into first layer of input register 2 of CDU2.
Byte 4 is written into first layer of input register 3 of CDU3.
Byte 5 is written into first layer of input register 4 of CDU0.
Byte 6 is written into first layer of input register 5 of CDU1.
Byte 7 is written into first layer of input register 6 of CDU2.
Byte 8 is written into first layer of input register 7 of CDU3.
and so on.

The W-state machine 48 enables the tri-state enables associated with bytes from all the CVU 46 such that a valid ATM cell is constructed on the W-Bus 32. The W-state machine 48 writes the cell into the memory array 12. Each CDU 50 receives a complete ATM cell and outputs it at 155 Megabits (OC-3) rate.

As can be seen by the mode encoding a mixed operation as switch, cell rate multiplexer and cell rate demultiplexer is possible.

In the above example, each CVU 46 and CDU 50 interface with a commercially available ATM physical layer part (not shown), such as part number PM5346 manufactured by PMC Sierra. This part is commonly known as Sunilite. Sunilite is 155 Megabit (OC-3) physical layer part.

In this regard, the apparatus 10 can also act in a multicast mode, where the mode register 126 would cause each CDU 50 to operate individually but receive a copy of an ATM cell that is received at a CVU 46 and then stored in the memory sub-array 16. After it is stored in the memory sub-array 16, it then is copied as many times is needed in distinct CDUs which are each associated with a different connectivity.

The present invention pertains to a method for switching an ATM cell. The method comprises the steps of receiving the ATM cell at a first input port of a switch from the ATM network. Then there can be the step of storing the ATM cell in one clock cycle in a memory array 12 of the switch. Next there is the step of reading the ATM cell in the memory array 12 in one clock cycle. Next there is the step of transferring the ATM cell from the memory array 12 to a first output port of the switch. Then there is the step of transmitting the ATM cell from the first output port to the ATM network 36.

The switch can be preferably the apparatus 10 described above. The first input port can be comprised of one or many CVUs as described above. The storing step can be the step of providing the ATM cell onto the W bus 32 and providing it to the memory array 12 as described above. The reading step can be the step of obtaining the bits of the ATM cell with the address information from a CDU as described above. The step of transferring the ATM cell from the memory array 12 to a first output port can be the step of transferring the bits of the ATM cell onto the W bus 32 to the registers 56 of the CDU 50 or CDUs 50 as described above. The first output port can be comprised of one or more CDUs 50 depending upon the application. The step of transmitting the ATM cell to the ATM network 36 can be the step of transferring bit by bit out of the registers 56 of a CDU or CDUs 50 through the register 129 as described above.

If a multicast mode is chosen by the mode register 126, then after the transferring step, there is the step of reading again the ATM cell in the memory array 12 in one clock cycle. Next there is the step of transferring the ATM cell from the memory array 12 to the first output port of the switch. Then there is the step of transmitting the ATM cell from the first output port to the ATM network 36. In this way, the ATM cell can be copied as many times as desired and sent out the same CDU or different CDUs 50 to different locations to achieve the multicast.

If the mode register 126 chooses a multiplexing mode for the apparatus 10, then the receiving step can include the step of receiving J portions of the ATM cell at J corresponding CVUs 56. The J CVUs 46 comprise the first input port. The transferring the ATM cell step can include the steps of transferring K portions of the ATM cell to corresponding K CDUs 50. In this instance, $J>1<K$ and J and K are integers. The K portions of the ATM cell comprise the ATM cell. The K CDUs 50 define the first output port. Thus, the ATM cell arrives at J CVUs and transmitted through K CDUs, where $K>J$.

In the event the apparatus 10 is used as a demultiplexer, the receiving the ATM cell at a first input port includes the steps of receiving P portions of the ATM cell at corresponding P CVUs 46. Here, $P>2$ and is an integer. The P portions of the ATM cell comprise the ATM cell. The P CVUs 46 define the first input port. The transferring step then includes the step of transferring Q portions of the ATM cell to Q CDUs 50. Here, $Q>1<P$ and Q is also an integer. Q portions of the ATM cell comprise the ATM cell and Q CDUs 50 comprise the first output port. Thus, for demultiplexing, P portions of the ATM cell arrive at P CDUs 50. The P portions are subsequently transferred out of the apparatus 10 through Q CDUs 60 in Q corresponding portions, where $P>Q$.

The present invention pertains to a switch for an ATM cell. The switch comprises I input ports which receive ATM cells from an ATM network 36, where $I>1$ and is an integer. The switch is also comprised of a memory array 12 connected to the I input ports for storing an ATM cell received by one of the I input ports in one clock cycle. The switch also comprises O output ports connected to the memory array 12, where $O<1$ and is an integer. One of the O output ports transmit an ATM cell which is received from the memory array 12 to the ATM network 36. Additionally, the switch comprises a controller connected to the memory array 12, I input ports and O output ports for controlling the storage of an ATM cell from one of the input ports into the memory array in one clock cycle.

The switch can be the apparatus 10 as described above. The I input ports can be the CVUs in various combinations as described above. The O output port can be the CDUs 50 in various combinations as described above. The controller can be comprised of an external controller 110 as described above and an internal controller. The internal controller can include the W state machine 48, for instance, and also, for instance, the mode register 126. Depending on the configuration, the internal controller can also include the reading or writing mechanism as described above such as a row decoder mechanism and a mechanism for selecting a memory sub-array.

If the switch is used for multicast, the controller causes the ATM cell to be copied at least two times and transmitted to one of the output ports. Preferably, one of the output ports is comprised of Q CDUs 50, where Q>1 and is an integer. In this way, the ATM cell is copied at least two times and multicast out through the same CDU 50 or several CDUs 50 to accomplish the multicast.

The switch can operate to simply move or transfer one ATM cell received at an input port through the memory array and out through a desired CDU of an output port to cause the cell to be moved on towards its desired destination.

If the switch is used as a demultiplexer, then preferably one of the input ports is comprised of P CVUs 46 which receive P corresponding portions of the ATM cell. Here, P>2 and is an integer, and the P portions comprise the ATM cell. Additionally, one of the 0 output ports is comprised of Q CDUs 50, where 1<Q<P. The controller causes the P portions of the ATM cell to be stored in one clock cycle in the memory array 12, then read in one clock cycle from the memory 12 into Q portions and transfer the Q portions of the ATM cell to Q corresponding CDUs 50. In this way, the P portions of the ATM cell are transmitted out the Q CDUs where P> Q.

If the switch is used as a multiplexer, one of the input ports is comprised of J CVUs 46 which receive J corresponding portions of the ATM cell. Here, J>1 and is an integer, and the J portions comprise the ATM cell. Preferably, one of the O output ports is comprised of K CDUs 50. Here, J>1<K. The controller causes the P portions of the ATM cell to be stored in one clock cycle in the memory array 12, then read in one clock cycle from the memory array 12 into K portions and transfer the K portions of the ATM cell to K corresponding CDUs 50. In this way, the J portions of the ATM cell are transmitted out of the switch as K portions where J< K, and multiplexing is obtained.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for manipulating ATM cells comprising:
a memory array in which an entire ATM cell can be read or written in one memory clock cycle, said memory array is comprised of N memory sub-arrays, where N>2 and is an integer, each memory sub-array having rows and columns of memory cells, with there being enough memory cells in each memory sub-array to Store all the bits Of an ATM cell; and a mechanism for reading or writing the entire ATM cell from or into the memory array in one memory clock cycle.

2. An apparatus as described in claim 1 wherein at least one row or column has enough memory cells to store all the bits of an ATM cell.

3. An apparatus as described in claim 2 wherein each row is RW bits wide and is greater than or equal to the number of bits in an ATM cell.

4. An apparatus as described in claim 3 wherein each column is CW bits wide, where CW>1.

5. An apparatus as described in claim 4 wherein the reading or writing mechanism includes a row reading or writing mechanism for reading or writing the ATM cell into a row of the memory array.

6. An apparatus as described in claim 5 wherein the reading or writing mechanism includes a mechanism for providing cells to the memory array, said providing mechanism in communication with the row reading or writing mechanism.

7. An apparatus as described in claim 6 wherein the row reading or writing mechanism includes a row decoder mechanism for decoding and selecting a row of the memory array, said row decoder mechanism in communication with said memory array.

8. An apparatus as described in claim 7 wherein the row reading or writing mechanism includes a mechanism for selecting a memory sub-array in communication with the memory array and the row decoder mechanism.

9. An apparatus as described in claim 8 wherein the providing mechanism includes a W bus along which ATM cells travel to the memory array, said W bus connected to the selecting mechanism.

10. An apparatus as described in claim 9 wherein the reading or writing mechanism includes a mechanism for delivering ATM cells from an ATM network to the W bus, said delivery mechanism connected with the W bus.

11. An apparatus as described in claim 10 wherein the reading or writing mechanism includes a mechanism for transferring ATM cells from the W bus to an ATM network, said transferring mechanism connected with the W bus.

12. An apparatus as described in claim 11 wherein the delivery mechanism includes a first mechanism for aligning the ATM cell so it is properly ordered to be written into the memory array when it is delivered to the W bus, said first mechanism in contact with the W bus.

13. An apparatus as described in claim 12 wherein the transferring mechanism includes a second mechanism for aligning the ATM cell so it is properly ordered after it is read from the memory array and transferred from the W bus to the ATM network, said second mechanism connected with the W bus.

14. An apparatus as described in claim 13 wherein the mechanism for selecting a sub-array includes a memory sub-array row data selector for reading or writing a memory sub-array.

15. An apparatus as described in claim 14 wherein the memory sub-array row data selector is comprised of N pass gate switch arrays, each pass gate switch array connected to a corresponding memory sub-array of the N memory sub-arrays, to the W bus and to the sub-array address decoder mechanism, said sub-array address decoder mechanism activating the pass gate switch array connected to the memory sub-array in which the ATM cell is to be written or read.

16. An apparatus as described in claim 15 wherein each pass gate switch array comprised of RW pass gate switches, each pass gate switch connected to a corresponding column of the corresponding memory sub-array and to the sub-array address decoder mechanism.

17. An apparatus as described in claim 16 wherein the first mechanism includes a plurality of cell vectorizing units which receive bits of an ATM cell from the ATM network and align them so they can be delivered in parallel to the W bus, said cell vectorizing units connected to the W bus, and a W-state machine connected to the cell vectorizing units to control which cell vectorizing unit delivers its ATM cell to the W bus.

18. An apparatus as described in claim 17 wherein the second mechanism includes a plurality of cell devectorizing units which receive bits of an ATM cell from the W bus in parallel and align them so they can be delivered to the ATM network, said cell devectorizing units connected to the W bus and the W-state machine, said state machine controlling which cell devectorizing unit receives an ATM cell from the W bus.

19. An apparatus as described in claim 18 wherein each cell vectorizing unit is comprised of at least one layer of a plurality of registers in series which receive the bits of an ATM cell, and a cell vectorizing state machine connected to the registers and the W-state machine, said cell vectorizing state machine controlling which bits of the cell go to which register, determines when all the bits of an ATM cell are stored in the registers, and releases the bits of the ATM cell in the registers to the W bus when the W-state machine instructs it to do so.

20. An apparatus as described in claim 19 wherein each cell devectorizing unit is comprised of at least one layer of a plurality of registers in series which receive the bits of an ATM cell from the W bus, and a cell devectorizing state machine connected to the registers and the state machine, said cell devectorizing state machine, determines when all the bits of an ATM cell are stored in the registers, and releases the bits of the cells in the registers to the ATM network.

21. An apparatus as described in claim 20 wherein the W bus is comprised of RW bus lines, each bus line connected to a corresponding pass gate switch in each pass gate switch array.

22. An apparatus as described in claim 21 wherein each register of the one layer of the cell vectorizing unit and the cell devectorizing unit is an 8-bit register having 8 register cells, each register cell holding a bit, each register cell connected to a corresponding bus line of the W bus.

23. An apparatus as described in claim 22 wherein the W-state machine causes memory interleaving of the bits of the ATM cell when they are read from or written into the memory array, and wherein H<RW and H<CW, where H>1 and is an integer.

24. An apparatus as described in claim 23 wherein 384 bits<RW<512 bits.

25. An apparatus as described in claim 24 wherein the memory array is a 4 megabit DRAM having N=16 memory sub-arrays and CW=RW=512 bits.

26. An apparatus as described in claim 27 wherein 1<H<256.

27. An apparatus as described in claim 26 wherein up to an additional 88 bits of data may be stored alongside an ATM cell.

28. A method for manipulating an ATM cell comprising the steps of:

providing an ATM cell to a memory array by aligning the ATM cell with a W bus connected to the memory array;

providing address information to identify the row in the memory array where the ATM cell is to be written;

writing the ATM cell into the row of the memory array in one memory clock cycle;

reading the ATM cell from the memory array in one clock cycle; and providing address information to identify the row in the memory array where the ATM cell is to be read.

29. A method as described in claim 28 wherein after the aligning step, there is the step of transferring the ATM cell in one clock cycle to the W bus.

30. A method as described in claim 29 wherein the providing address information step, there is the step of sending a control signal to desired pass gates connected to the memory array and the W bus bit of an ATM cell pass through the pass gate to a designated memory cell in the memory array.

31. A method as described in claim 30 wherein the aligning step includes the step of storing bits of the ATM cell in registers in a CVU.

32. A method as described in claim 31 including after the aligning step, there is the step of sending a sync cell ready signal to a W-state machine when the bits are properly aligned.

33. A method as described in claim 32 wherein after the sending step, there is the step of sending a dequeue cell signal to the CVU state machine.

34. A method as described in claim 33 wherein after the providing address information for reading includes the step of sending a sync ready for cell signal to the W-state machine from a CDU.

35. A method as described in claim 34 including after the sending a sync ready for cell signal, there are the steps of sending a control signal to desired pass gates connected to the memory array and the W bus, and transferring the bits of the ATM onto the W bus from the memory array.

36. A method as described in claim 35 including after the step of reading the bits, there are the steps of sending a cell_is_written signal to the CDU and storing the bits of the ATM cell in registers in the CDU in one clock cycle.

37. A method as described in claim 36 after the step of storing the bits in the CDU, there is the step of reading each clock cycle from the registers and sending one byte then to an ATM network.

38. A method as described in claim 37 including after the step of reading one byte, there is the step of transferring all remaining bytes of the ATM cell in a first layer of registers to a second layer of registers at a predetermined time.

* * * * *